United States Patent [19]
Stephens

[11] 3,860,888
[45] Jan. 14, 1975

[54] TIME-SHARING TWO FREQUENCY LASER
[75] Inventor: Ronald L. Stephens, Altadena, Calif.
[73] Assignee: Xerox corporation, Stamford, Conn.
[22] Filed: July 19, 1973
[21] Appl. No.: 380,771

[52] U.S. Cl......... 331/94.5 C, 331/94.5 Q, 350/275
[51] Int. Cl............................................... H01s 3/10
[58] Field of Search .......... 331/94.5; 350/160, 266, 350/275, 7

[56] References Cited
UNITED STATES PATENTS
3,492,600  1/1970  Zitter................................. 331/94.5

Primary Examiner—William L. Sikes

[57] ABSTRACT

A dual frequency laser including in the laser cavity an active laser medium which has at least two laser transition frequencies from a common upper energy level, and rotating means for changing the reflectivity coefficient of one of the end mirrors of the laser cavity such that the laser cavity can be made to favor oscillations at either one of the possible laser transition frequencies. The rotating means can be a rotating polygon with selected faces having coatings favorable to the reflectance of oscillations at different ones of the laser transition frequencies, or a rotating, totally reflective mirror that reflects any light from the laser medium onto stationary mirrors having coatings favorable to the reflectance of oscillations at different ones of the laser transition frequencies. Synchronizing means are provided to excite the laser medium slightly prior to the time that a coating having a desired reflectivity coefficient is functionally aligned in the laser cavity such that it will act as an end mirror of the laser cavity.

7 Claims, 2 Drawing Figures

TIME-SHARING TWO FREQUENCY LASER

BACKGROUND OF THE INVENTION

Lasers are light-amplifying devices adapted specifically to produce high intensity pulses of coherent monochromatic light concentrated in an extremely narrow bandwidth. Light is produced in a laser by photonic emission from the active atoms of a body of a so-called laser material. This emission occurs incident to the transition of the atoms from an excited, intermediate stable energy level to a lower energy level. Accordingly, laser operation essentially involves exciting active atoms in the laser body to such intermediate energy levels, and inducing the transition of the excited atoms to lower energy levels in a manner controlled to utilize the light thereby emitted to provide the desired laser output pulse. The nature and number of interlevel transitions which must be effected in a complete atomic cycle of laser operation are dependent on the properties of the particular laser material used.

For some applications, it is desirable to provide a laser than can lase at two separate frequencies. For example, a two or dual frequency laser may have application in the detection and measurement of atmospheric constituents for air pollution measurements or, possibly, the detection of toxic gases. Since a sample can be irradiated at two separate frequencies, the relative intensity of the light scattered at the two different frequencies depends on the dispersion of the scatter and could in turn be used for identification of the scatter. A dual frequency laser could find application in a multi-color system by using second harmonic generation to yield two additional colors, or using stimulated Raman scattering to yield several new wavelengths. The time-sharing feature of a dual frequency laser could also find application in communications.

One type of variable frequency laser of the prior art includes a gas laser medium in which the frequency is varied by varying the gas pressure, thereby varying the index of refraction of the material in the light propagation path. Such pressure control of frequency is, however, relatively slow and cumbersome. In another type of prior art variable frequency laser, described in U.S. Pat. No. 3,426,293, the frequency of a laser output beam is changed by varying the effective radius of the reflecting end plates of the laser cavity. Structurally, variation of the effective radius of the reflecting end plates is achieved by positioning an apertured diaphragm within the laser cavity, that is, intermediate the reflective end plates of the laser cavity. When the apertured diaphragm is rotated, it appears to the system as either a circle or an elipse and thereby the effective radius of the reflective end plates is changed, with a resulting change in lasing frequency. The latter type of frequency adjustment apparatus is undesirable due to its high sensitivity. It is commonly necessary to provide with such apparatus a gear train or other suitable motion reducing mechanism connected to the apertured diaphragm in order to control the movement of the diaphragm.

Another laser apparatus, using a rotating member, is described in U.S. Pat. No. 3,426,294. In that apparatus, a laser cavity provided as a part of a wave-energy propagation path is terminated at one end by a plane mirror which is rotated into a position for reflectively terminating the propagation path. A telescope system is disposed between the rotatable mirror and the laser cavity. The telescope system increases the effective Q-switching speed of the laser cavity by decreasing the amount of rotation necessary in order to change the reflection angle of the rotatable mirror.

SUMMARY OF THE INVENTION

It is an object of the present invention to provide an improved dual frequency laser.

It is a further object of the present invention to provide a laser cavity that can lase at different frequencies.

It is a further object of the present invention to provide an improved dual frequency laser that does not require mechanical variations in the size of intercavity members.

In accordance with the invention, the aforementioned objects are attained by a laser apparatus including in the laser cavity an active laser medium which has at least two laser transition frequencies from a common upper energy level. Since these transitions have a common upper energy level, they cannot lase simultaneously since the first to lase will use the population inversion achieved by pumping and thus inhibit the other transition or transitions. The particular transition to lase will be the one that has the highest net gain in a given laser configuration, the gain being determined primarily by the reflectance coefficient of one of the end mirrors of the laser cavity. Thus, the lasing frequency can be controlled by varying the reflectance coefficient of one of the end mirrors of the laser cavity such that the gain of the laser favors only one of the possible laser transition frequencies.

Regulation of the gain of selected laser transitions can be achieved by providing, as one of the end mirrors of the laser cavity, a polygon with alternate surfaces of the polygon coated with materials that have a reflectance coefficient favorable to different ones of the possible laser transition frequencies. Alternatively, regulation of the gain of selected laser transitions can be achieved by providing dispersed mirrors with different reflectance coefficients favorable to different ones of the possible laser transition frequencies, and a totally reflective rotating mirror which allows either one of the dispersed mirrors to define an end of the laser cavity. By rotating the polygon of the first-mentioned embodiment or the totally reflective mirror of the second-mentioned embodiment, and firing the laser pumping medium at the proper time in relation to the position of a surface or face of the polygon or mirror, a selected one of the polygon surfaces or a selected one of the dispersed mirrors will form an end mirror of the laser cavity with the result that a selected one of the possible laser transition frequencies will be reflected by the end mirror and hence will lase.

Other objects of the invention will become readily apparent to those skilled in the art in view of the following details disclosure and description thereof, especially when read in conjunction with the accompanying drawings.

DESCRIPTION OF THE PREFERRED EMBODIMENT

Figure 1:
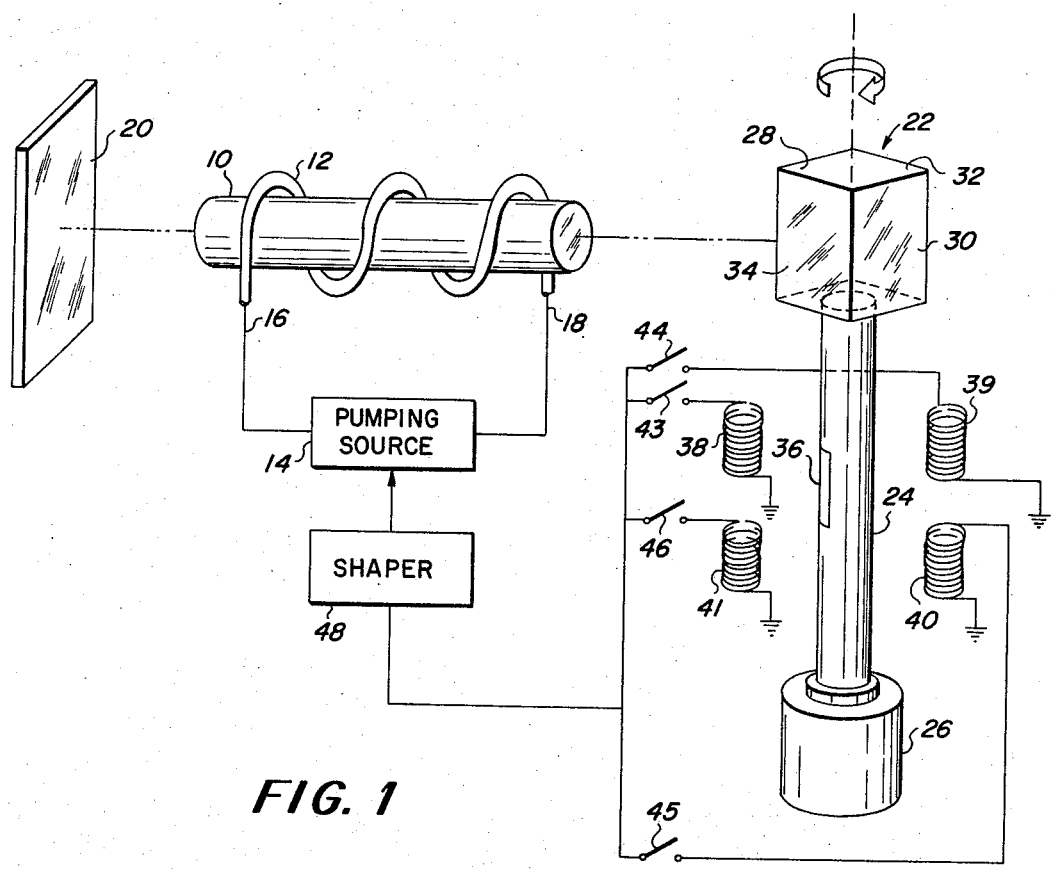
FIG. 1 is a diagrammatic illustration of a dual frequency laser apparatus constructed in accordance with the present invention.

Referring now to FIG. 1 of the accompanying drawings, the laser apparatus includes an active laser component 10 in the form of a cylindrical rod-shaped body of a solid laser material having opposed plane end faces perpendicular to its long axis. Laser rod 10 is chosen of a material that will lase at two distinctly different frequencies that have a common upper energy level. A source of pumping radiation for laser rod 10 is provided, for example, by a helical flash tube 12 disposed to surround the rod 10 concentrically for the entire rod length. Flash tube 12 functions on the gaseous discharge principle, and is especially designed to emit pulses of light including light of the wavelength of the upper energy level or absorption band of the laser rod 10. Tube 12 is provided with an appropriate power supply or pumping source 14 (of conventional design and including a high-voltage source of current and capacitors for energy storage) which is connected through leads 16 and 18 to the opposite ends of the flash tube 12.

The laser rod 10 is disposed within a cavity defined on one end by a stationary broad-band dielectric mirror 20 positioned along a projection of the longitudinal axis of rod 10. Mirror 20 is partially transmissive, for example, 50 percent transmissive, over a relatively wide frequency band. To complete the laser cavity, a cube-shaped member 22 also is positioned along the projection of the longitudinal axis of rod 10. Cube 22 is mounted on a shaft 24 which is driven by a suitable motor 26 to affect rotation of cube 22 about an axis transverse to the longitudinal axis of the laser cavity.

Alternate faces of cube 22 are coated with materials that will produce substantially 100 percent reflectivity of light at the two distinctly different frequencies that the laser rod 10 will lase. If rod 10 is yttrium aluminum garnet doped with neodynium, which has two laser wavelengths at $1.064\mu$ and $1.319\mu$ (wavelengths corresponding to the frequency transitions from energy level $4_{F3/2}$ to energy levels $4_{I11/2}$ and $4_{I13/2}$), faces 28 and 30 of cube 22 would have dielectric coatings substantially 100 percent reflective of light at $1.064\mu$ wavelength, and faces 32 and 34 of cube 22 would have dielectric coatings substantially 100 percent reflective of light at $1.319\mu$ wavelength. By way of example, cube 22 could be fused quartz, the coatings on faces 28 and 30 could be dual, quarter wavelength thick layers of zinc sulfide and magnesium fluoride, that is, a layer of zinc sulfide about 1.064/4 microns thick deposited over a layer of magnesium fluoride about 1.064/4 microns thick when rod 10 is yttrium aluminum garnet, and coatings 32 and 34 also could be dual, quarter wavelength thick layers of zinc sulfide and magnesium fluoride, that is, a layer of zinc sulfide about 1.319/4 microns thick deposited over a layer of magnesium fluoride about 1.319/4 microns thick when rod 10 is yttrium aluminum garnet. The layers of zinc sulfide and magnesium fluoride could be deposited upon the faces of cube 22 by conventional vapor deposition techniques. With the exemplified structure, broadband dielectric mirror 20 could be comprised of a fused quartz substrate coated on the laser cavity-side with a conventional material having a bandwidth about 50 percent transmissive at both the $1.064\mu$ wavelength and the $1.319\mu$ wavelength.

Cube 22 is disposed so that each of its faces 28, 30, 32 and 34 is brought into parallel opposed relation with the dielectric mirror 20, intersecting the laser cavity axis and perpendicular thereto, once during each revolution of shaft 24. When one of the faces of cube 22 is in parallel opposed relation with mirror 20, the face will constitute a second end surface terminating the laser cavity so that energy of the proper frequency from rod 10 and energy of the proper frequency reflected by mirror 20 is reflected by the face through rod 10 to mirror 20, thereby placing the laser in a high Q, or lasing, condition.

The wavelength of the laser output is determined by the reflectance coefficient of the first face of the cube 22 to come into parallel alignment with mirror 20 after the laser rod 10 has been pumped by flash lamp 12. If either of the faces 28 and 30 come into parallel alignment with mirror 20 before faces 32 and 34 achieve that position, the wavelength of the laser output will be $1.064\mu$. Since the laser cannot lase simultaneously at both the $1.064\mu$ and the $1.319\mu$ transitions, the first frequency to lase will use the population inversion produced by pumping the laser and the other transition will be inhibited from lasing. Likewise, if either of the faces 32 and 34 comes into parallel alignment with mirror 20 before faces 28 and 30 achieve that position, the wavelength of the laser output will be $1.319\mu$.

The initiation of the pumping light pulse supplied to rod 10 by lamp 12 is synchronized with the rotation of cube 22, so that lamp 12 is flashed just prior to the time that the desired face of cube 22 comes into parallel opposed relation with mirror 20. If the shaft 24 is rotating at about 400 cycles per second, lamp 12 should be flashed about $160\mu s$ prior to the parallel opposed alignment condition of the mirror 20 and a desired face of cube 22. As an example, an electro-magnetic configuration could provide suitable synchronization between the position of the faces of cube 22 and the time of firing of lamp 12. For example, a magnetic slug 36 is attached to shaft 24 and evenly spaced electro-magnetic pick-up devices 38, 39, 40 and 41 are positioned around shaft 24 in the vicinity of slug 36 such that slug 36 passes one of the pick-up devices $160\mu s$ prior to a face of cube 22 coming into parallel disposed alignment with mirror 20. The pick-up devices 38, 39, 40 and 41 are coupled via switches 43, 44, 45 and 46, respectively, and a pulse shaper 48, to the fire control electrode of source 14 such that upon closure of one or more of the switches proper synchronization can be established between the time of firing of lamp 12 and the position of a face of cube 22. Alternatively, the contact plate synchronizing device described in U.S. Pat. No. 3,426,294, could be used for synchronizing the rotation of cube 22 with the firing of lamp 12.

When the requisite charge has been developed by source 14 and the motor 26 is driving the shaft 24 at a predetermined angular velocity, the passage of slug 36 by one of the magnetic pick-up devices generates a pulse. If it is desired to generate an output pulse of $1.064\mu$ once during each revolution of shaft 24, switch 43 is closed and the pulse generated by pick-up device 38 actuates flash lamp 12 with the resultant light directed into the laser rod 10 to establish a very large intermediate level population of atoms in rod 10. At a predetermined time after the initiation of pumping ($160\mu s$ with shaft 24 rotating at 400 cps), face 28 of cube 22 is carried by the continuous rotation of the shaft 24 into the requisite parallel disposed position with the mirror 20 to shift the laser cavity from a low Q condition to a high Q condition. As soon as parallelism is established, light emitted due to spontaneous atomic transitions from the higher energy level of rod 10 to the lower energy level of rod 10, that is, light having a wavelength of $1.064\mu$ when rod 10 is yttrium aluminum garnet doped with neodymium and transitions are from the $4_{F3/2}$ level to the $4_{F11/2}$ level, begins to reflect back and forth between mirror 20 and the coating on face 28 since that coating is substantially 100 percent reflective of light having a wavelength of $1.064\mu$. The reflected light causes further transitions from the high energy level to the lower energy level. A portion of this reflected light is emitted through mirror 20 to provide the laser output pulse. The continuing rotation of the cube 22 carries face 28 quickly through and beyond the high Q position of the laser cavity (parallelism of the end mirrors) and the cavity reverts to a low Q condition. The rise time of the output pulse of the laser is rapid and of short duration because of the rapidity with which face 28 of cube 22 passes in and out of the high Q position. If output pulses having a wavelength of $1.319\mu$ are desired now, either or both switches 44 and 46 are closed, and such an output pulse will be generated each time faces 30 and 32 of cube 22 come into parallel angular relation with mirror 20. Likewise, if it is desired to generate alternate output pulses having wavelengths of $1.064\mu$ and $1.319\mu$, all of the switches 43, 44, 45 and 46 would be closed.

Figure 2:
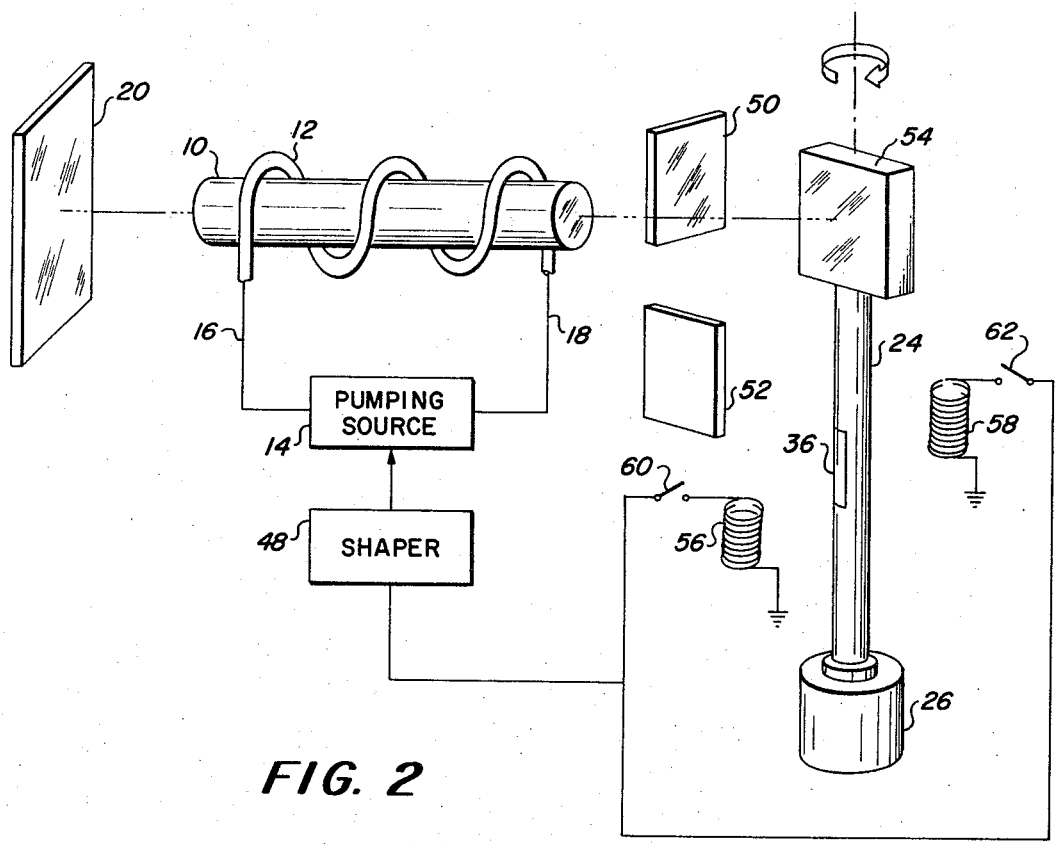
FIG. 2 is a diagrammatic illustration of another embodiment of a dual frequency laser apparatus constructed in accordance with the present invention.

In FIG. 2, in which components corresponding to those of FIG. 1 have the same reference numerals, a further embodiment of the invention is depicted in which stationary mirrors 50 and 52, having dielectric coatings with reflectance coefficients favorable to energy wavelengths of $1.319\mu$ and $1.064\mu$, respectively, are disposed adjacent one end of rod 10. A totally reflective, rotating mirror 54, disposed along the projected axis of rod 10, reflects any light from rod 10 onto each of the mirrors 50 and 52 once during each cycle of revolution of mirror 54. Magnetic slug 36 cooperates with magnetic pick-up devices 56 and 58 such that upon closure of one of the switches 60 and 62, for example, switch 60, lamp 12 is flashed $160\mu s$ (assuming rotation of mirror 54 at 400cps) prior to the time that mirror 54 reflects light onto the dielectric coating of mirror 52, thereby producing an output beam having a wavelength of $1.064\mu$. An output beam of $1.319\mu$ is produced by closing switch 62.

While the present invention has been described with reference to preferred arrangements, it will be understood to those skilled in the art that various changes may be made and equivalents may be substituted for components thereof without departure from the true spirit and scope of the invention. For example, cube 22 could be sapphire, fused silica, or borosilicate crown glass, and the coatings on faces 28, 30, 32 and 34 could be multiple quarter wavelength coatings of other materials known in the art to produce reflectance at least wavelengths, such as, for example, coatings of silicon dioxide, titanium dioxide, aluminum dioxide, or thorium fluoride. Suitable materials and layer compositions for the coatings on the faces of cube 22 are described in an article appearing in the Nov., 1969, issue of Laser Focus magazine, entitled "Coatings for 1, 2, Even 3 Wavelengths" by Costich. Furthermore, a polygon having more or less than four sides may be substituted for the cube 22. Additionally, if a laser madium that lases from one frequency to more than two frequencies is used as rod 10, faces of the rotating polygon could be coated with substances that have reflectivity coefficients favorable to each of the lasing frequencies of that laser medium.

The present invention is not limited to solid lasers and can be used with gaseous lasers. For example, a helium-neon laser which lases from a common upper energy level at 730 nm and $1.06\mu m$ can be used. In this case the quarter wavelength coatings on the faces 28 and 30 of cube 22 and on mirror 50 would be highly reflective of light having a wavelength of 730 nm, and the quarter wavelength coatings on the faces 32 and 34 of cube 22 and on mirror 52 would be highly reflective of light having a wavelength of 1.06 um.

What is claimed is:

1. A laser apparatus operable at at least two frequencies comprising:

a resonant cavity having first and second ends disposed from each other along an optical axis to define a single optical path therebetween, an active laser medium within said cavity, said laser medium disposed along said optical axis and being adapted to produce radiation transitions between a first pair of energy levels and a second pair of energy levels, pumping means for exciting said laser medium to produce radiant energy of a first frequency and radiant energy of a second frequency corresponding to said radiation transitions, a fixed, partially reflective mirror terminating said first end of said cavity, and rotating means for terminating said second end of said cavity with a first surface having a reflection coefficient more favorable to generation of light of said first frequency than light of said second frequency, and then with a surface having a reflection coefficient more favorable to generation of light of said second frequency than light of said first frequency.

2. The apparatus of claim 1 wherein said rotating means is a polygon having an axis of rotation transverse to said optical axis and a plurality of plane faces parallel to said axis of rotation, one of said faces supporting said first surface and another of said faces supporting said second surface.

3. A laser apparatus operable at at least two frequencies comprising:

a resonant cavity having first and second ends disposed from each other along an optical axis to define a single optical path therebetween, an active laser medium disposed within said cavity along said optical axis, said laser medium being adapted to produce radiation transitions between a first pair of energy levels and a second pair of energy levels, pumping means for exciting said laser medium to excite said laser medium to produce radiant energy of a first frequency and radiant energy of a second frequency corresponding to said radiation transitions, a broad-band reflector terminating said first end of said resonant cavity and being disposed substantially perpendicular to said optical axis, rotating means for alternately terminating said second end of said resonant cavity with a first surface more reflective of light of said first frequency than light of said second frequency and then with a second surface more reflective of light of said second frequency than light of said first frequency, and means for energizing said pumping means when one of said surfaces approaches parallelism with said broad-band reflector, thereby to generate an output beam of either said first frequency of said second frequency.

4. The apparatus of claim 3 wherein said rotating means is a polygon carrying said first and second surfaces about an axis perpendicular to said optical axis such that said first surface and said second surface are alternately moved to a position parallel to said broad-band reflector.

5. The apparatus of claim 4 wherein said last mention means includes a magnetic device carried by the drive means for said polygon and a plurality of magnetic pick up devices coupled to said pumping means.

6. A dual frequency laser apparatus comprising:

a resonant cavity having first and second ends disposed from each other along an optical axis to define a single optical path, an active laser medium disposed within said cavity along said optical axis, said laser medium being adapted to produce radiation transitions between a first pair of energy levels and a second pair of energy levels, pumping means for exciting said laser medium to produce radiation energy of a first frequency and radiation energy of a second frequency corresponding to said transitions, a broad-band reflector terminating said first end of said optical cavity, a rotatable polygon terminating said second end of said optical cavity, said polygon having surfaces disposed perpendicular to said optical axis, at least one of said surfaces of said polygon being more reflective of light of said first frequency than light of said second frequency, and at least another of said surfaces of said polygon being more reflective of light of said second frequency than light of said first frequency, first means for rotating said polygon about an axis perpendicular to said optical axis such that said one surface and said other surface of said polygon are disposed alternatively in parallel relation with said broad-band reflector, and second means for synchronizing the firing of said pumping means with the rotation of said polygon such that said laser medium is energized slightly prior to the time that one of said surfaces of said polygon comes into parallel relation with said broad-band reflector.

7. A laser apparatus operable at at least two frequencies comprising:

a resonant cavity, an active laser medium disposed within said cavity, said laser medium being adapted to produce radiation transitions between a first pair of energy levels and between a second pair of energy levels, pumping means for exciting said laser medium to excite said laser medium to produce radiation energy of a first frequency and radiation energy of a second frequency corresponding to said transitions, a broad-band stationary reflector terminating one end of said resonant cavity, a first stationary mirror more reflective of light of said first frequency than light of said second frequency disposed at the end of said resonant cavity remote from said broad-band reflector, a second stationary mirror more reflective of light of said second frequency than light of said first frequency disposed at said end of said resonant cavity remote from said broad-band reflector, rotary light reflective means disposed adjacent said first and second stationary mirrors for causing radiant energy emitted by said laser medium to fall alternately upon said first mirror and then upon said second mirror, and means for synchronizing the firing of said pumping means with the rotation of said rotary reflective means such that said laser is energized slightly prior to the time that said rotary reflective means will reflect light onto either said first mirror or said second mirror.

* * * * *